US010027473B2

(12) United States Patent
Castellucci et al.

(10) Patent No.: US 10,027,473 B2
(45) Date of Patent: Jul. 17, 2018

(54) VERIFIABLE REDACTABLE AUDIT LOG

(71) Applicant: Palantir Technologies Inc., Palo Alto, CA (US)

(72) Inventors: Ryan Castellucci, Millbrae, CA (US); Philip Martin, San Jose, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 208 days.

(21) Appl. No.: 15/149,499

(22) Filed: May 9, 2016

(65) Prior Publication Data

US 2016/0254906 A1 Sep. 1, 2016

Related U.S. Application Data

(63) Continuation of application No. 14/223,918, filed on Mar. 24, 2014, now Pat. No. 9,338,013.
(Continued)

(51) Int. Cl.
*H04L 9/06* (2006.01)
*H04L 9/32* (2006.01)
(Continued)

(52) U.S. Cl.
CPC ........ *H04L 9/0643* (2013.01); *G06F 11/3476* (2013.01); *G06F 17/30144* (2013.01);
(Continued)

(58) Field of Classification Search
CPC ... H04L 9/0643; H04L 9/3247; H04L 9/3265; H04L 9/3297; G06F 17/30144; G06F 21/552; G06F 21/64; G06F 11/3476
See application file for complete search history.

(56) References Cited

U.S. PATENT DOCUMENTS 5,978,475 A 11/1999 Schneier et al.
6,057,757 A 5/2000 Arrowsmith et al.
(Continued)

FOREIGN PATENT DOCUMENTS

CH 2897051 8/2017
CN 101729531 6/2010
(Continued)

OTHER PUBLICATIONS

Bruce Schneier et al. "Cryptographic Support for Secure Logs on Untrusted Machines" The Seventh USENIX Security Symposium Proceedings, Usenix Press, Jan. 1998 (pp. 53-62) https://www.schneier.com/paper-secure-logs.pdf.*
(Continued)

*Primary Examiner* — Joseph P Hirl
*Assistant Examiner* — Thomas Gyorfi
(74) *Attorney, Agent, or Firm* — Knobbe, Martens, Olson & Bear, LLP

(57) ABSTRACT

A verifiable, redactable log, which, in some embodiments, may contain multiple hash values per entry in order to sever confidentiality of a log from verifiability. Logs may be verified using recalculation of hashes and verification of trusted digital signatures. In some embodiments, the log may be divided into segments, each signed by a time server or self-signed using a system of ephemeral keys. In some embodiments, log messages regarding specific objects or events may be nested within the log to prevent reporting omission. The logging system may receive events or messages to enter into the log.

21 Claims, 8 Drawing Sheets

Related U.S. Application Data

(60) Provisional application No. 61/921,965, filed on Dec. 30, 2013.

(51) Int. Cl.
*G06F 17/30* (2006.01)
*G06F 11/34* (2006.01)
*G06F 21/55* (2013.01)
*G06F 21/64* (2013.01)

(52) U.S. Cl.
CPC ............ *G06F 21/552* (2013.01); *G06F 21/64* (2013.01); *H04L 9/3247* (2013.01); *H04L 9/3265* (2013.01); *H04L 9/3297* (2013.01)

(56) References Cited

U.S. PATENT DOCUMENTS

| | | | |
|---|---|---|---|
| 6,643,613 B2 | 11/2003 | McGee et al. | |
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,028,223 B1 | 4/2006 | Kolawa et al. | |
| 7,069,586 B1 | 6/2006 | Winneg et al. | |
| 7,117,430 B2 | 10/2006 | Maguire et al. | |
| 7,225,468 B2 | 5/2007 | Waisman et al. | |
| 7,596,285 B2 | 9/2009 | Brown et al. | |
| 7,739,246 B2 | 6/2010 | Mooney et al. | |
| 7,770,032 B2 | 8/2010 | Nesta et al. | |
| 7,801,871 B2 | 9/2010 | Gosnell | |
| 7,877,421 B2 | 1/2011 | Berger et al. | |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,601,326 B1 | 12/2013 | Kirn | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,799,867 B1 | 8/2014 | Peri-Glass et al. | |
| 8,924,389 B2 | 12/2014 | Elliot et al. | |
| 8,931,043 B2 | 1/2015 | Cooper et al. | |
| 8,938,434 B2 | 1/2015 | Jain et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,129,321 B2* | 9/2015 | Boding | G06Q 30/06 |
| 9,230,060 B2 | 1/2016 | Friedlander et al. | |
| 9,338,013 B2 | 5/2016 | Castellucci et al. | |
| 2002/0112157 A1* | 8/2002 | Doyle | H04L 63/0823 |
| | | | 713/157 |
| 2002/0194058 A1 | 12/2002 | Eldering | |
| 2003/0088438 A1 | 5/2003 | Maughan et al. | |
| 2003/0171942 A1 | 9/2003 | Gaito | |
| 2004/0117387 A1 | 6/2004 | Civetta et al. | |
| 2004/0123139 A1 | 6/2004 | Aiello et al. | |
| 2004/0153418 A1 | 8/2004 | Hanweck | |
| 2004/0153837 A1 | 8/2004 | Preston et al. | |
| 2004/0250124 A1 | 12/2004 | Chesla et al. | |
| 2005/0102328 A1 | 5/2005 | Ring et al. | |
| 2005/0157662 A1 | 7/2005 | Bingham et al. | |
| 2005/0229256 A2 | 10/2005 | Banzhof | |
| 2005/0234909 A1* | 10/2005 | Bade | G06F 21/552 |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0129992 A1 | 6/2006 | Oberholtzer et al. | |
| 2006/0161558 A1 | 7/2006 | Tamma et al. | |
| 2006/0209085 A1 | 9/2006 | Wong et al. | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0143851 A1 | 6/2007 | Nicodemus | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0199047 A1 | 8/2009 | Vaitheeswaran et al. | |
| 2009/0228701 A1 | 9/2009 | Lin | |
| 2009/0271637 A1 | 10/2009 | Takekawa et al. | |
| 2009/0282097 A1 | 11/2009 | Alberti et al. | |
| 2009/0328222 A1 | 12/2009 | Heiman et al. | |
| 2010/0077481 A1 | 3/2010 | Polyakov et al. | |
| 2010/0100963 A1 | 4/2010 | Mahaffey | |
| 2010/0125470 A1 | 5/2010 | Chisholm | |
| 2010/0211550 A1 | 8/2010 | Daniello et al. | |
| 2010/0228786 A1 | 9/2010 | Török | |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0131547 A1 | 6/2011 | Elaasar | |
| 2011/0202555 A1 | 8/2011 | Cordover et al. | |
| 2011/0219450 A1 | 9/2011 | McDougal et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0290879 A1 | 11/2012 | Shibuya et al. | |
| 2012/0330801 A1 | 12/2012 | McDougal et al. | |
| 2013/0006947 A1 | 1/2013 | Akinyemi et al. | |
| 2013/0019306 A1 | 1/2013 | Lagar-Cavilla et al. | |
| 2013/0024731 A1 | 1/2013 | Shochat et al. | |
| 2013/0091084 A1 | 4/2013 | Lee | |
| 2013/0097130 A1 | 4/2013 | Bingol et al. | |
| 2013/0097709 A1 | 4/2013 | Basavapatna et al. | |
| 2013/0139268 A1 | 5/2013 | An et al. | |
| 2013/0198565 A1 | 8/2013 | Mancoridis et al. | |
| 2013/0226879 A1 | 8/2013 | Talukder et al. | |
| 2013/0239217 A1 | 9/2013 | Kindler et al. | |
| 2013/0246316 A1 | 9/2013 | Zhao et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0156617 A1 | 6/2014 | Tomkins | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0366132 A1 | 12/2014 | Stiansen et al. | |
| 2015/0012509 A1 | 1/2015 | Kirn | |
| 2015/0039565 A1 | 2/2015 | Lucas | |
| 2015/0112641 A1 | 4/2015 | Faraj | |
| 2015/0128274 A1 | 5/2015 | Giokas | |
| 2015/0188715 A1 | 7/2015 | Castellucci et al. | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |

FOREIGN PATENT DOCUMENTS

| | | |
|---|---|---|
| CN | 103281301 | 9/2013 |
| DE | 102014213036 | 1/2015 |
| DE | 602014012479.8 | 8/2017 |
| EP | 1566758 | 8/2005 |
| EP | 1962222 | 8/2008 |
| EP | 2551799 | 1/2013 |
| EP | 2892197 | 7/2015 |
| EP | 2897051 | 7/2015 |
| EP | 2963578 | 1/2016 |

(56) References Cited

FOREIGN PATENT DOCUMENTS

| EP | 2985974 | 2/2016 |
|---|---|---|
| EP | 2897051 | 8/2017 |
| EP | 3255549 | 12/2017 |
| GB | 2517582 | 2/2015 |
| NL | 2013134 | 1/2015 |
| NL | 2011642 | 8/2015 |
| WO | WO 2005/010685 | 2/2005 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

Bhuyan et al., "Network Anomaly Detection: Methods, Systems and Tools" First Quarter 2014, IEEE, 34 pages.
Notice of Acceptance for Australian Patent No. 2014203669 dated Jan. 21, 2016.
Notice of Allowance for U.S. Appl. No. 14/033,076 dated Mar. 11, 2016.
Notice of Allowance for U.S. Appl. No. 14/094,418 dated Jan. 25, 2016.
Notice of Allowance for U.S. Appl. No. 14/223,918 dated Jan. 6, 2016.
Notice of Allowance for U.S. Appl. No. 14/823,935 dated Apr. 25, 2016.
Official Communication for European Patent Application No. 15180985.2 dated Jan. 15, 2016.
Official Communication for U.S. Appl. No. 14/223,918 dated Jun. 8, 2015.
Official Communication for U.S. Appl. No. 14/731,312 dated Apr. 14, 2016.
Official Communication for U.S. Appl. No. 14/816,748 dated Apr. 1, 2016.
Official Communication for U.S. Appl. No. 14/849,454 dated Feb. 24, 2016.
Official Communication for U.S. Appl. No. 14/849,454 dated Jan. 29, 2016.
Official Communication for U.S. Appl. No. 14/877,229 dated Mar. 22, 2016.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.
Baker et al., "The Development of a Common Enumeration of Vulnerabilities and Exposures," Presented at the Second International Workshop on Recent Advances in Intrusion Detection, Sep. 7-9, 1999, pp. 35.
Crosby et al. "Efficient Data Structures for Tamper-Evident Logging" Department of Computer Science, Rice University.
FireEye—Products and Solutions Overview, http://www.fireeye.com/products-and-solutions Printed Jun. 30, 2014 in 3 pages.
FireEye, http://www.fireeye.com/ Printed Jun. 30, 2014 in 2 pages.
Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.
Glaab et al., "EnrichNet: Network-Based Gene Set Enrichment Analysis," Bioinformatics 28.18 (2012): pp. i451-i457.
Hur et al., "SciMiner: web-based literature mining tool for target identification and functional enrichment analysis," Bioinformatics 25.6 (2009): pp. 838-840.
Johnson, Steve, "Access 2013 on demand," Access 2013 on Demand, May 9, 2013, Que Publishing.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Pythagoras Communications Ltd., "Microsoft CRM Duplicate Detection," Sep. 13, 2011, https://www.youtube.com/watch?v=j-7Qis0D0Kc.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
VirusTotal—About, http://www.virustotal.com/en/about/ Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/473,860 dated Jan. 5, 2015.
Official Communication for Australian Patent Application No. 2014203669 dated May 29, 2015.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for Great Britain Patent Application No. 1411984.6 dated Dec. 22, 2014.
Official Communication for Netherlands Patent Application No. 2013134 dated Apr. 20, 2015.
Official Communication for New Zealand Patent Application No. 627061 dated Jul. 14, 2014.
Official Communication for U.S. Appl. No. 14/280,490 dated Jul. 24, 2014.
Official Communication for U.S. Appl. No. 14/479,863 dated Dec. 26, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/823,935 dated Dec. 4, 2015.
Official Communication for European Patent Application No. 17184252.9 dated Aug. 31, 2017.

* cited by examiner

VERIFIABLE REDACTABLE AUDIT LOG

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/223,918, filed Mar. 24, 2014, titled "Verifiable Redactable Audit Log," which claims benefit of U.S. Provisional Patent Application No. 61/921,965, filed Dec. 30, 2013, titled "Verifiable Redactable Audit Log," which are hereby incorporated by reference in their entireties.

TECHNICAL FIELD

The present disclosure relates to systems and techniques for event logging. More specifically, the present disclosure relates to securing, verifying, and redacting computer generated logs.

BACKGROUND

Many organizations, such as corporations or government entities, have requirements, whether legal, financial, medical, educational, or private regulations, that require event logging. Logs of events, such as computing events or real world events, are often logged in log files or databases by computing systems. Such a record of events can be modified by malicious parties prior to review by an administrator or auditor.

Verifiable logs, using one-way hashing algorithms, have been used to validate log entries. These logs use a hash chain where each log entry's hash is dependent upon all log entries and their hashes that occurred previous to the log entry. In addition to hash chains, tree logging structures have also been suggested as a more efficient data structure to build tamper-evident logs.

SUMMARY

The systems, methods, and devices described herein each have several aspects, no single one of which is solely responsible for its desirable attributes. Without limiting the scope of this disclosure, several non-limiting features will now be discussed briefly.

In various embodiments, a logging computer system may comprise one or more hardware processors configured to cause the computer system to receive an event from an event submission entity, the event comprising event data describing the event, determine one or more metadata items associated with the event, calculate a log entry hash associated with the event, the log entry hash dependent on the event data, calculate a log summary hash associated with the event, the log summary hash dependent on the log entry hash, at least one metadata item of the one or more metadata items, and a second log summary hash, wherein the second log summary hash is associated with a second log entry received previous to the event, and store a recorded log entry in an electronic event log, wherein the recorded log entry comprises the event data, the at least one metadata item of the one or more metadata items, the log entry hash, and the log summary hash, and wherein the electronic event log comprises a plurality of log entries organized in a list according to time, each recorded log entry comprising a plurality of hashes, wherein at least one of the plurality of hashes is dependent on a previous log entry summary hash.

In various embodiments, plurality of log entries further comprises a plurality of commitment entries, each comprising a time entry and a digital signature of the time entry, wherein at least one log entry previous to each of the plurality of commitment entries comprises a public key associated with the digital signature.

In various embodiments the public key may be an ephemeral key. The ephemeral keys may be discarded after a configurable time period and wherein a third log entry may comprise a second public key distinct from the public key and associated with a second digital signature and associated with at least one second plurality of commitment entries.

In various embodiments, the time entry and digital signature are received from a remote time server associated with the public key.

In various embodiments, the one or more hardware processors are further configured to cause the computer system to isolate a specific log entry based on a query, determine a commitment log entry in the plurality of commitment entries, wherein the commitment log entry is occurs after the specific log entry, segment the electronic event log resulting in an electronic log portion, the electronic log portion comprising the specific log entry, the commitment log entry, and a plurality of other log entries, redact the plurality of other log entries by obfuscating a salt and other event data associated with each other log entry in the plurality of other log entries, and store the electronic log portion in data storage.

In various embodiments, the event comprises multiple events associated with an object, and the log entry hash associated with the log entry is dependent on all log summary hashes previously associated with the object.

In various embodiments, a computer system may comprise one or more hardware processors configured to cause the computer system to store an electronic event log in data storage, the electronic event log comprising a plurality of log entries organized in a list according to time, each log entry comprising a plurality of hashes, metadata, log entry data and a salt, wherein a first hash of the plurality of hashes is dependent on one or more previous log entry summary hashes, and a second hash of the plurality of hashes is dependent on the log entry data and the salt, commit one or more entries in the log based on a verifiable digital signature, select a segment of the electronic event log, the one or more segments of the log comprising at least one commitment and a plurality of event log entries, redact one or more log entries in the segment, wherein each redacted log entry that comprises duplicate log event data with other log entries in the segment comprise distinct log entry hashes, provide the segment of the electronic event log to a computing device.

In various embodiments, the electronic event log comprises a second plurality of second log entries comprising a plurality of commitment entries, each comprising a time entry and a digital signature of the time entry, wherein each commitment entry is associated with a signed public key appearing in the electronic event log.

In various embodiments, the time entry and digital signature are received from a remote time server associated with the public key.

In various embodiments, one or more log entries of the plurality of log entries comprises multiple events associated with an object, and the first hash associated with the log entry is dependent on multiple event data associated with the object.

In various embodiments, a computer-implemented method may comprise, under control of a computing system configured with specific computer executable instructions, the process of receiving event information from an event submission entity, the event information comprising event data describing the event, determining one or more metadata items associated with the event information, determining a salt comprising pseudo-random data, calculating a log entry hash associated with the event information, the log entry hash dependent on the event data and the salt, calculating a log summary hash associated with the event information, the log summary hash dependent on the log entry hash, at least one metadata item of the one or more metadata items, and a second log summary hash, wherein the second log summary hash is associated with a previous log entry, storing a recorded log entry in an electronic event log, wherein the recorded log entry comprises the event data, the salt, the at least one metadata item of the one or more metadata items, the log entry hash, and the log summary hash.

In various embodiments, the public key may be an ephemeral key which is discarded after a configurable time period and wherein a second log entry comprises a second public key distinct from the public key and is associated with a second digital signature and associated with at least one second plurality of commitment entries.

In various embodiments, the time entry and digital signature are received from a remote time server associated with the public key.

In various embodiments, the method may further comprise isolating a specific log entry based on a query, determining a commitment log entry in the plurality of commitment entries, wherein the commitment log entry is occurs after the specific log entry, segmenting the electronic event log resulting in an electronic log portion, the electronic log portion comprising the specific log entry, the commitment log entry, and a plurality of other log entries, redacting the plurality of other log entries by obfuscating a second salt and other event data associated with each other log entry in the plurality of other log entries, and storing the electronic log portion in data storage.

In various embodiments, the event comprises multiple events associated with an object, and the log entry hash associated with the log entry is dependent on all log summary hashes previously associated with the object in the electronic event log.

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION OF SPECIFIC EMBODIMENTS

Overview

Figure 1:
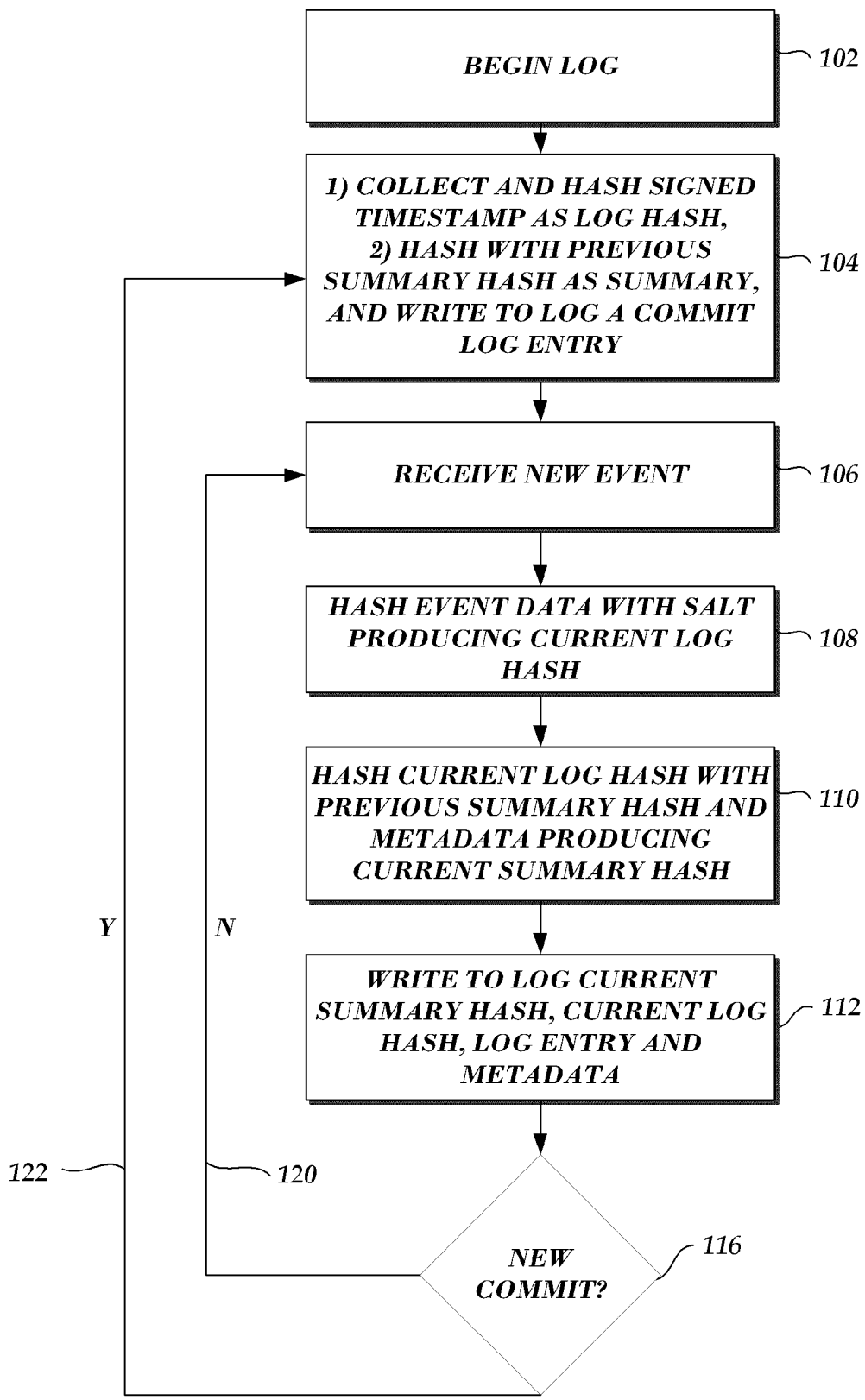
FIG. 1 illustrates a flowchart depicting operations of a logging system according to some embodiments of the present disclosure.

A logging system is disclosed in which, in various embodiments, the system may receive events to log, and store the logged events in a verifiable and redactable log data structure. In an embodiment, an event is logged such that the event log entry includes multiple pseudo-random character strings that are dependent on the log entry, at least one of which is also dependent on previous log entries. In some embodiments, the log may be redacted while maintaining its verifiable structure without allowing an attacker to determine possible log entries fitting the redacted events. To aid in log usability, a time-stamped digital signature by a trusted time server may be employed to create logging checkpoints and allow segmentation of the log. In one scenario, the time-stamped digital signatures may be based on self-employed ephemeral keys. Another possible feature of the logging system may be to employ log event nesting for particular objects so as to detect tampering or deletion of the object's log entries.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: A broad term for any data structure or data store, including a text log file, for storing and/or organizing data, including, but not limited to, relational databases (Oracle database, mySQL database, Microsoft Access, MS SQL Server, or other SQL database, etc.), spreadsheets, XML files, and/or text files, among others.

Event: For the purposes of the present disclosure, the term "event" is a broad term, including its plain and ordinary meaning, including any piece of information generated or associated with an object, or other log generating entity, that has a temporal component as associated metadata. An event may be an object, and may have other metadata, which may include the associated object or entity, a type of event or message type ID, an associated object ID such as a network address such as a MAC address, associated authentication information, or hashes or cypher text versions thereof, among other metadata.

Data Object, Object, or Feature: A data container for information representing specific things in the world that have a number of definable properties. For example, a data object can represent an entity such as a vehicle, a person, a place, an organization, a market instrument, or other noun. A data object can represent an event itself that happens at a point in time or for a duration, including an event generated by another object, such as a log message indicating access of an object at a specific point in time (e.g., server X was accessed at 10:30 am on Jan. 21, 2014 by George Washington). A data object may be associated with a unique identifier that uniquely identifies the data object. The object's attributes (for example, metadata about the object) may be represented in one or more properties (e.g., for the event above, the time, date, person who accessed the object, etc., may be considered metadata). Examples of objects include, but are not limited to, events, computer servers, directories, databases, generated events involving any object (the event may be an object itself), license-plate reads, traffic incidents (such as accidents), criminal events, law enforcement activities (for example, traffic citations), vehicles, persons (for example, drivers, vehicle owners, IT administrators or computer analysts/users), and computer network devices, among others.

Metadata or Properties: These terms are broad terms, encompassing their plain and ordinary meaning, including attributes of a data object/feature/event/log message. At a minimum, each property/metadata has a type (such as a property type) and a value or values. Properties/metadata associated with features/objects/events/log messages may include any information relevant to that feature/object. Features/objects/events/log messages may be associated with various other features/objects/events/log messages, metadata and/or properties. For example, a server object may be associated with various related servers, connected network devices, access by administrators or users, startup or shutdown events, and the like.

Hash: For the purposes of the present disclosure, the term "hash" is a broad term, including its plain and ordinary meaning in the fields of cryptography and software, including the output from a hash function, cryptographic hash function, or any function that maps data of an arbitrary or fixed length to data of a fixed length in a one-way, deterministic fashion that is pseudo-random in appearance. For example, a hash function may take an arbitrary block of data and return a fixed-size bit/character string, the hash, such that any (accidental or intentional) change to the data will (with very high probability) change the output hash if the same hash function is executed on the changed block of data. Good candidates for the hash function generating the hash over a message include functions that make it infeasible to generate a message that has a given hash, infeasible to modify a message without changing the hash, and infeasible to find two different messages with the same hash. Examples of functions that may generate a hash (hashing functions or cryptographic hash functions) may include: GOST, NAVAL, MD2, MD4, MD5, PANAMA, RadioGatun, RIPEMD, SHA-0, SHA-1, SHA-256, SHA-512, SHA-3, Tiger(2), WHRILPOOL, their variants (including any various and output length), or any other cryptographic hash function. A hash may also be interpreted as a message authentication code (such as MAC or HMAC), where the hash is performed in combination with a secret or randomizing key. For example, the hash could be performed by concatenating the key or one or more random bits (referred to as a "salt"—see further definition below) with the data to be hashed, resulting in a one way hash that is dependent on both the key/salt and the data. A message with an HMAC may be authenticated by hashing the message with the same key/salt and comparing with the HMAC hash to verify a match. The term hash may also be used as a verb to indicate applying a function that results in a hash or HMAC hash.

Salt: For the purposes of the present disclosure, the term "salt" is a broad term, including its plain and ordinary meaning in the field of cryptography, including random data that is used as an additional input to a one-way function. Salts may be used to defend against dictionary attacks and pre-computed table attacks. In the present disclosure, it can be used to prevent guessing redacted log messages by further randomizing hash outputs for individual instances of repeated log messages.

Hash Chain: For the purposes of the present disclosure, the term "hash chain" is a broad term, including its plain and ordinary meaning in the field of cryptography, including the successive application of a cryptographic hash function to incoming log messages and in addition to data dependent on the values of previous log messages. In the present disclosure, this may refer to a plurality of summary hashes that are dependent on the values of all previous summary hashes and their associated log messages.

Log Verification Solutions

There exists a number of problems when using current methodology for detecting tampering of log messages within a log. For example, in the past, log messages have been protected using chained hashes. Basically, if one has a series of log messages, such as a list of log messages in a text file, then tampering with one log message can be detected in future log messages by including a hash in each future log message. Those future log messages are then each dependent upon the contents of all previous log messages that contain the hash values. Thus, if a log message was altered (for example by deleting a log message or changing a log message) then the tampering can be detected by reevaluating the hash chain and comparing to the hash chain values contained within the log.

Take for example three log messages. The first log message in this example states "Aug. 21, 2013, user John Doe accessed server 1." The second log message may state "Aug. 22, 2013, user Jane Doe accessed server 1." The third log message may state "Aug. 23, 2013, user John Doe accessed server 2." To protect the series of log messages, a hash may be calculated over the first log message, resulting in an apparent random (e.g., appearing pseudo random from a hashing algorithm but determinant based on the log text) character string added to the log message that is dependent on the log message. This may then be stored along with, or as a part of, the log message.

The second log message might also include a hash that is a hash over the first log message's hash value, but also includes the text of the second log message. This makes the second log message's hash value dependent on both the contents of the first message (via dependence on the first log message's hash value) and the contents of the second message. If there is any alteration of the contents of the first or second message, then the hash would need to be changed. Thus, if there is a tampering in the first or second message, then a recomputing of all the hashes belonging to all the log messages can detect the tampering. For example, the second log's recomputed hash would not equal the second message's associated hash value, and therefore a change in the log could be detected. Likewise, if a log entry was deleted, some data that is a dependency of future hash messages will be erased. Again, in this scenario, if all hashes are recomputed, the resulting hash message for the second log entry will be different than the hash value that is stored with the second log entry, and this difference indicates that the log was tampered with. The hash chain may continue by creating a hash for the third log message that is computed over the third log message and the hash from the second log message. This chain may be continued for the length of the log to secure all entries in the log.

Commitment and Segmentation

The example hash chain, however, has several limitations. First, an attacker may conceal their tampering by altering both the log messages and the hashes within a log. For example, if the second log message was tampered with, this can be detected by comparing recalculated hashes associated with the second log message or the third log message (or any later log message) with the recorded log messages. However, if an attacker also recomputes and alters in the log the hashes of the second and third log messages (and any later log messages), based on recalculating hashes over the tampered information, and changes all subsequent hash values within the log to match, then verifying the hashes can no longer detect changes in the log because all the hash values will match when the whole log is verified.

To address this problem, in some embodiments, entries in a log can be committed to the log via a third party or first party time server that cryptographically signs, with a digital signature, the current hash value (or any value that is dependent on previous log entries). Such a digital signature (and all digital signatures referenced herein) may be implemented using standard public/private key cryptography, such as RSA (with or without using digital certificates to securely publish public keys). In other words, if the party that's trying to guarantee security trusts this time server, and the time server guarantees that a certain hash value was in the log chain at a given time by signing the hash value and the time entered, then that hash value can be considered a true hash value in the log chain. Therefore, changes in the message log, such as in the rewriting attack example described above, will be detected because the hash values cannot be recalculated due to the time-dependent property of the digital signature. For example, if a hash value that is dependent on previous log messages is signed by the time server, and indicated to exist at a certain period of time indicated by the time server, then that log message's hash cannot be altered due to properties of the digital signature.

Digital signatures have the property that they can be verified with a public key, but signed with a private key. The verification is performed with a public key which is known to many and verifiable usually using a digital certificate, but may also be used without a digital certificate by using standard public key/private key cryptography, such as an RSA algorithm. So long as the public key is trusted and the private key remains secret to only the time server, then the digital signature cannot be altered without detection. This guarantees that the hash for that log entry that was signed existed when that log message was entered, and therefore cannot be rewritten without detection. This allows the log or logging server/system to periodically insert a checkpoint log entry into the log effectively making previous log entries permanent (and cannot be rewritten/tampered) in the log and prevents tampering without detection of those previous log entries.

Time stamping using a commit also presents new ways to verify a log. For example, the entirety of a log need not be presented in order to be verified. Instead, the log can be verified between commit statements. For example, if a log server creates a log with a commitment by a time server and periodically creates commitment entries throughout the log as time progresses, then the hash values of the signed log entries that existed in the middle of the log may be used as a starting reference hash values, and each log message in the log chain subsequent to those signed starting hash values can be verified using that starting hash value (without starting at the beginning of the log). In this manner, the hash chain can be verified up until the next commit that ends the sequence of an example segment. Thus, between commit statements the log cannot be rewritten unless tampering is detected.

This allows logs to be segmented in various sizes according to commit statements. Such segmentation advantageously means that if a log needs to be verified, for example in response to a log inquiry such as a subpoena to a court or a Freedom of Information Act (FOIA) request, then the entire contents of the log need not be released by the logging entity, and instead can be mostly held in reserve, and only those segments of the log that have relevant information in them need be released and verified. Thus, this creates smaller released file sizes, and creates less of a burden to verify the logs.

Secure Redactable Logs

In some embodiments, log segments may also need to be redacted. For example, in response to a FOIA request or a subpoena, various information about other users in a log other than say a subject of the FOIA request or subpoena may be required to verify the log message. However, at the same time, it is desirable that this unrelated information about other users or resources should remain confidential. Thus, there may exist a need to redact log entries, especially of individual log segments, while maintaining verifiability of the log.

Some embodiments described herein advantageously overcome the redaction problem by separating out the hash chain of a log and its required dependence on previous log entries to maintain verifiability, from the data/message of the log entries themselves. This may be performed by including a second hash value that hashes the log message which may be in turn be used as a dependency in a log hash chain (herein referred to as summary hashes), rather than having direct dependence on the log message. This allows the log to be partially redacted for those entries where confidentiality is required. However, in this new log format where each log entry has two hash values, for example a first hash value that is dependent on the log message and a second hash value that is dependent on the first hash value and previous log messages (the summary hash), then the first hash value (of the log message) can be used as input to the hash chain values for verification instead of the log message itself. This allows the text of log messages to be redacted while maintaining verifiability. This severs confidentiality from verification using the indirect, rather than direct, relationship between the log messages and the summary hashes of the hash chain.

Another potential issue that arises when redacting logs is that the redaction may not be 100% effective, especially when an attacker can generate candidate log entries based on the associated hash values in the log despite the actual log messages being redacted. For example, if the same log message appears more than once in a log, then that log message may have a repeated hash value in the log even though the log message itself is actually redacted. Based on the frequency of specific/identical log messages occurring in the log, the amount in volume of the same log messages occurring in the log, and the spacing in the log between certain identical hash values appearing in a redacted log (in other words exploiting the entropy (or lack thereof) found within the log), candidate log messages could be generated by an attacker. This may give an attacker clues to the information that has been redacted. In order to solve this problem and make the redactions effective (e.g., undetectable by a hacker that is attempting to deduce portions of a log that have been redacted), the disclosure herein may apply a salt to each hash value of a log message. This salt results in further randomizing the hash values in log entries that have identical messages so that two identical log messages do not have the same log message hash. This may prevent an attacker from generating candidate log messages for redactions.

Ephemeral Keys

In some scenarios, a remote or local timestamp server cannot be used for commitments. This may occur when a timestamp server may not have a public certificate or a trusted key held in tamper-proof hardware. In such cases, it may be advantageous to use a temporary private key sometimes known as an ephemeral key to sign the commitment entries in a log. For example, an ephemeral key can be used to sign a private key to be used to verify the log. Then at periodic intervals a new private key can be generated with a corresponding public key, and that public key can be posted to the log and signed by the previous private key. Such a digital signature can be verified using the previous private key. After such a signature, going forward, all commitments in the log will be based on using the new private key, and verified using the new public key. The old private key will be deleted or discarded such that it could not ever be retrieved again on the logging system. This creates a chain of trusted public keys based on generated private keys, where the private keys are thrown away as soon as the system is done signing with those keys.

Thus, only the most recent key can ever be found on the logging system which protects security for all keys previous to the current key. In other words, so long as the previous ephemeral keys were trusted, no log message can be rewritten because the commits signed the hash chain of previous log messages use the previous keys that cannot be recovered by an attacker. In this way, a logging device need not communicate to a third party for timestamped digital signatures or be forced to use the same public key for an extended period of time in order to sign its own timestamps in the hash chain. Thus, an ephemeral key may be useful when rotating keys could be advantageous or when a timestamp server is unavailable. Ephemeral keys may be rotated on a configurable periodic basis (for example, based on time elapsed, number of commit entries written, number of log entries written, etc.).

Nesting Log Entries for Specific Objects/Events

When responding to a FOIA request or subpoena, especially when only segments of a log (not the whole log) are the response to such an inquiry, another problem may arise. This problem is that certain log messages that have to do with an object that is the subject of the subpoena or FOIA request could potentially be left unreported by the entity that is responding by leaving out certain log segments in its response. For example, in the case where a logged message occurs when a specific car is detected in an intersection, each occurrence or sighting of that car may be logged to an event log. And if there are a number of sightings, say ten sightings of the car at various times, they may appear in various segments of the log. In one scenario, even though there are ten sightings of the car, only nine are included in the response. The one missing sighting or log entry is not reported, but exists in its own or different segment of the log that was not a part of the response. The logging entity, by merely not sending that segment of the log in the response, may make it appear that events in the log segment not reported may never have happened.

To overcome this, the current disclosure may use nesting log entries in order to show that no previous log entries have been omitted. This is done by including in each subsequent log entry related to a particular event or object, all the previous log messages or hash values for the previous log messages as a part of the log message. For example, in the sixth log message that reports a sighting of the same car in the intersection, the hashes for the previous five sightings will also appear in the log entry for the sixth sighting.

Therefore, in the example above, if the third sighting of the car went unreported in an omitted segment from the response, then the sixth sighting of the car would have a hash value in it that doesn't correspond to any log entry (e.g., the hash value for the third log entry). If this is the case, then an unreported log entry having to do with that object can be detected as being unreported.

More details of various embodiments are described below, in addition to other advantages and solutions to various security problems.

Description of the Figures

Embodiments of the disclosure will now be described with reference to the accompanying figures, wherein like numerals refer to like elements throughout. The terminology used in the description presented herein is not intended to be interpreted in any limited or restrictive manner, simply because it is utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Figure 7:
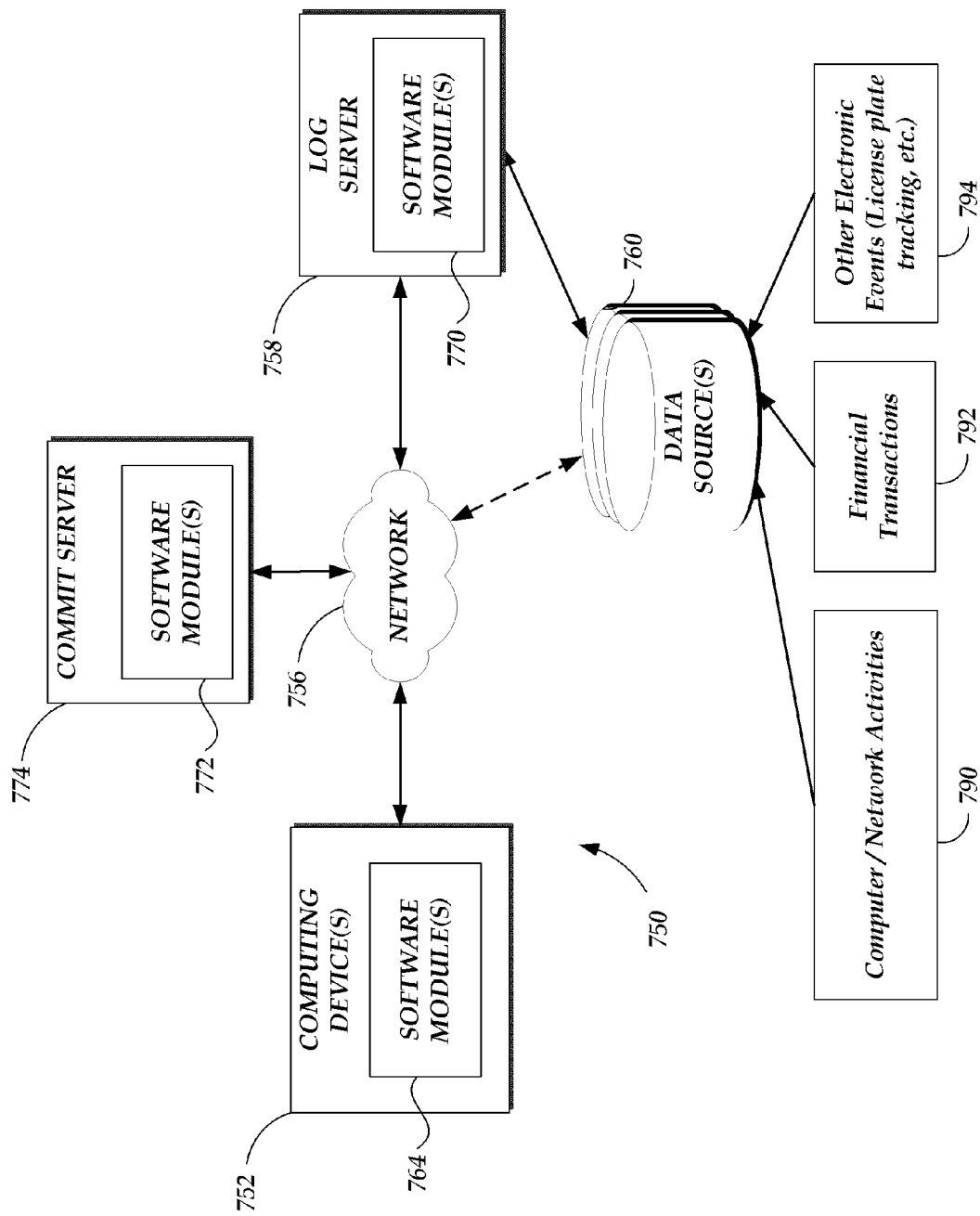
FIG. 7 illustrates a verifiable and redactable logging system according to embodiments of the present disclosure.

FIG. 1 illustrates a method or program instruction flow for a logging server (or servers) or program (or programs) that receives new events or log entries to be included in the log, such as the server depicted in FIG. 7.

Figure 2:
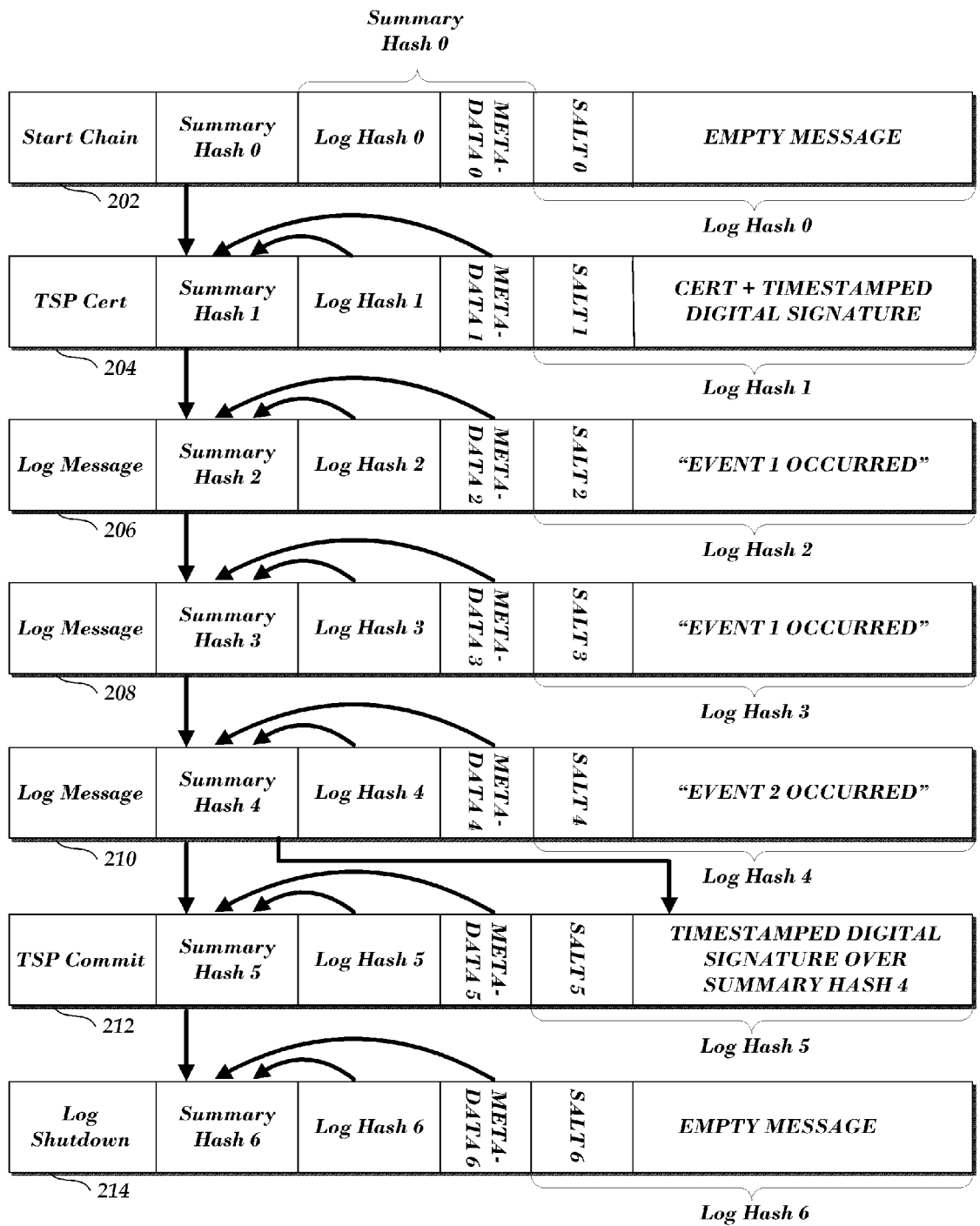
FIG. 2 illustrates a verifiable and redactable logging data structure according to some embodiments of the present disclosure.

In block 102, a new log may be begun via an initial log entry. This new log entry may be empty, or in some embodiments, could comprise a digital signature of a timestamp server including a signature thereof or by the local logging server with an ephemeral key. This can be considered as the first log entry into the chain of log entries. It may comprise an empty message as depicted in FIG. 2, although it may also comprise a salt value as well as other metadata. In addition, it may comprise a log hash that is calculated over, and is dependent on, the empty message/digital signature and a random salt. It may also comprise a summary hash value. The summary hash value may be dependent on the original log hash for the empty message and various metadata for the empty message. Such a summary hash can be considered the start of the hash chain that can be used to verify later log messages.

Metadata stored as a part of a log entry may include a variety of properties of the log message, or properties of objects involved in the log message, such as, but not limited to, the date and/or time associated with the log message (either when a certain action occurred or when the event or log message was received), a message type identifier (such as the kind of log message it is or whether it's the start of a chain or the signing by a timestamp or a commit or a shutdown log entry), a signature over a timestamp or a stand-alone timestamp for information included in the log, nanoseconds associated with the log entry, fields reserved for future use, a node identifier for a particular entity either logging the log message or generating the log message, or other information associated with the log message.

A node identifier may include, for example, a MAC address of a network card associated with a device or server sending or receiving the information to be logged, an IP address associated with the device or server. Similarly, the node identifier could also include a hash of such a MAC address or IP address, etc.

The message type may include a text description of a log message type, or a message-type ID or identifier values corresponding to the same. Metadata may also include information on the exact hashing algorithm used to calculate the hash. In addition, the log hash values themselves may be considered metadata. In some embodiments, metadata may even be considered the actual message itself and/or the salt value. The above list of metadata is by way of example and is not meant to be limiting to any properties that are associated with the event or the log message, etc. Any combination of metadata may be used in a log message.

After the start of the chain, a second log entry may occur that signs and timestamps the chain. For example, in block 104, a second log entry may be created corresponding to a commit entry that locks in all previous entries to the log. In this block, the logging server may collect and hash a signed timestamp, by querying a time server, and request a signed timestamp from the time server. This may include a request to sign, in addition to the timestamp, a hash associated with the previous log entry (in this embodiment, the summary hash from the initial log entry). In some embodiments, the logging server may then treat this information as the log message, for which a log hash may be calculated.

The time server may then hash the log hash with the previous summary hash and possibly additional metadata to create the commitment entry's summary hash. Its dependence on the log hash and previous summary hash preserves the verifiability of the hash chain. In some embodiments, because commitment log entries may not ever need to be redacted, log hashes for commitment entries may not be required. In this embodiment, the summary hash could include the signed timestamp/hash directly. Additionally, the signed timestamp, possibly including a hash, may be a part of the log entry as metadata instead of the log message portion of the message. The commitment log entry may then be written to the log.

In block 106, a new log message or event to log may be received. For example, a program may be memory-resident on a logging server. It may receive over local unix sockets or through a network including, but not limited to, via communication over local/wide area networks, messages from programs or other computing devices that listen to log messages. Such received information that is an event can include the log message that should be logged, or an object in an event type which may then generate a log message by the log server and may also include metadata described above. Alternatively, metadata associated with the newly received event to be logged can be calculated by the logging server, such as the time that it was received, the type of log event it is, the object, etc.

Once the information to be logged has been received and any values related to the log message, for example, metadata having been calculated, then in block 108 the logging program can calculate hashes for the log entry. This block or block 106 can also include generating a salt which may be a random string using methods of randomization as known to one skilled in the art, such as various pseudorandom algorithms producing a pseudorandom output for use to enable security of redacted log entries when a log is to be redacted. For example, the pseudorandom algorithm could be a cryptographically secure pseudorandom number generator. Such a cryptographic pseudorandom number generator could include, for example, algorithms conforming to the standard FIPS 186-2 or NIST SP 800-90A or other suitable algorithms. It may comprise a pseudorandom string as 16 bits, for example.

Once the salt has been calculated or generated, such as in block 108 or 106, the log server, at block 108, can then hash the event data with the salt in order to produce a current log hash. This hash may be referred to as the log hash, although it may take any name for a hash associated with the message portion of the log entry. For example, based on the message to be logged that is in association with the event, a log message may comprise text information. This text information may be hashed along with the salt in order to produce a log hash string that is dependent on both the salt and the log message.

In block 110, after determining a hash that is dependent on both the salt and the current log message to be entered into the log, a second hash may be calculated, referred to as the summary hash. No matter the naming used, its role is to be the next entry of the verifiable hash chain. The summary hash may be dependent on the current log hash, which is in turn dependent on the salt and the log message. The summary hash may also be dependent on the metadata of the current log message and the previous summary hash from the previous log message. This makes the summary hash indirectly dependent on both the current log entry and all entries appearing in the log previous to the current log entry. Therefore, without rewriting all previous summary hashes in the log (which are secured periodically with commitment log entries), the log cannot be tampered with without possible detection. Thus, in block 110, the summary hash is calculated across those dependent data described above such as the log hash, the metadata for the current log entry and the previous summary hash.

In block 112, a new log entry is written to the log including, for example, data indicating the type of log message, the summary hash for that current log message, the log hash for that current log message, any metadata associated with the current log message, the salt, and the log message generated by the logging server or the event that is associated with the current event. In this manner, one log message can be entered after another. For example, if no commitment is going to take place in 116, then in block 120 the cycle repeats with the server receiving another log message to be logged. In which case, the log server may receive a new event, and then create again for this new event another current log hash (block 108) and another summary hash (block 110) dependent upon the current log entry and the previous log entries. This process continues until the log server/program decides to perform a new commitment as determined in block 116.

A new commitment (116) may be determined based on, for example, a number of log entries written to a log. In this case, after a configurable number of log entries have been written to the log, a new commit will take place and the program will again sign a timestamp and enter that information into the log (block 104). In another embodiment, the commitments can take place on a periodic time such as, for example, every day, once every 24 hours, or once an hour, or once every 5 minutes, etc. This time period can be configurable by an administrator.

Once a new commit takes place, the program may then again, in some embodiments, execute block 104 which collects a timestamp to be hashed and then hash that with the previous summary hash to create a new summary hash, and the process repeats once again with this commitment log entry being written into the log.

FIG. 2 illustrates an example log data structure that may be considered verifiable according to the embodiments described herein. The actual log may be a text file with a set data structure where each line of the text file comprises a new log entry of a fixed length. Alternatively, each line of the text file could be log entries of a non-fixed length. For example, it could comprise fields separated by a delimiter, such as a comma separated values file that does not have a fixed length. In the alternative, the log can be stored in a different data structure, such as an SQL database, or other similar database structure where the log entries are indexed according to time, and/or indexed according to a generated ID number, so long as each log entry can be considered to have a previous or next log entry similar to a textual log. In some embodiments, the log can be a tree data structure using a hashing tree instead of a hash chain. For example, such a tree structure is described in the article by Crosby, Scott A., and Dan S. Wallach. "Efficient Data Structures For Tamper-Evident Logging." in USENIX Security Symposium, pp. 317-334. 2009, which is hereby incorporated by reference in its entirety and made a part of this specification. In this type of embodiment, the two tiered logging structure to preserve redaction capabilities of the log (e.g. having both a log hash on a per entry basis and a tree/summary hash dependent on parent tree nodes for example, including using an optional salt, may still be used with the tree type structure.

The log may also be stored in segmented log files, such that each entry to the log, except for the starting entries, have log entries that are previous to the log entry and have log entries that come after the log entry, and this structure and order can be determined based on the information stored in the log or log database.

The information illustrated in FIG. 2, regardless of the actual data structure of the log, illustrates the dependencies that each log entry and the properties of that log entry have in relation to the same log entry and the previous log entries, according to one embodiment. For example, log entry 202 may comprise a first entry entered into a log by a logging server. That entry may, on the leftmost field of the log entry, indicate the type of log message. In this case, for log entry 202, that type may be an indicator of the start of a new log chain. The log entry may also have other fields, such as summary hash, log hash, metadata, a salt such as salt, and a log message. One example of a log message for the start of a new log could be an empty message or it could be another message such as a random number. Logs do not necessarily have to have a start chain log entry. Instead, it may comprise a normal log entry with an actual log message (e.g., associated with an object). One difference between the first entry in the log chain and other entries is that the summary hash, unlike other summary hashes for other log entries later in the chain, is not dependent on previous log entries. For other log segments, the first summary hash entry may be dependent on the last entry from another log segment.

For the start chain log message 202, the log hash 0 is a hash that takes as a key salt 0 as randomly generated, as described previously, and the empty message, where other log messages correspond to the start of the chain. This hash is then stored in the data field log hash 0. Metadata, such as metadata 0 which may comprised multiple fields of data, may also be stored in the log entry. This metadata may include information about the actual message, the node ID, the message type, the hash type being used, the message identifier, and/or any other information related to the event being logged including an object or calculated information about the object/event. In some embodiments, the calculated time may be stored in the metadata and this calculated time may be used to order the log messages. Alternatively, log messages may instead be ordered based on another alternative identifier such as increasingly larger numbers that are assigned to each log entry as it is entered into the log. Alternatively, the order of log entries can merely be defined by how the log is stored, or the order log messages are written or received. For example, it may be ordered by which entry comes before and after a message in a text file.

The next log entry, log entry 204, may be similarly organized. For example, it may comprise a type of log message value as indicated by the TSP CERT message type. This type of message, for example, could indicate that a time server has published a certificate that it will use to sign all log entries, for example, commitment log entries such as log entry 212. Such a log entry could include, for example, in the log message field or in other fields, a timestamp that is digitally signed using the private key corresponding to the certificate and may also include the certificate itself in some embodiments. If the certificate is trusted, then the digital signature on the timestamp can be cryptographically verified. Additionally, if the digital certificate is trusted and the entity (such as the time server) holding the digital certificate is trusted, then this signature indicates that this log entry was entered into the log at the time stamp indicated. This information may then, along with the salt in the SALT 1 field, be used to calculate the log hash for the entry, as done with previous entries. Log hash 1 and the associated metadata 1 with this log entry can be used as inputs into summary hash 1 along with the previous summary hash 0. Thus, in this embodiment, summary hash 1 is the calculated value to be dependent on metadata 1 for log entry 204, log hash 1 associated with log entry 204, and summary hash 0 which is associated with log entry 202. Thus, log entry 204 can be verified by recalculating the hashes for log entry 202 and 204 in order to detect any tampering.

Moving to the next entry in the log, log message 206, this may comprise a normal log message as sent to the logging server by an external entity or by any process running on the current server. It may be collected over the network or via inter-process communication. Like the other log messages, it may have a log message portion. For example, log entry 206 includes the log message indicating that "EVENT 1 OCCURRED", which may be indicated with various data characters, flags, etc. The log message can correspond to any type of event that may be logged, such as logging different access times to various secure devices, logging log-on and log-off times for users, logging when a car drives through an intersection as detected by a sensor, or logging when a seismic activity occurs, etc. In other words, the log message can log any event and have any associated text in the log entry that is associated with an event and a time that the event occurred, or the time that a log entry was entered into the system.

Like the previous log entries, the log entry 206 may be hashed along with a newly generated salt, salt 2. These two together may be concatenated together and hashed in the log hash 2, or the log message can be hashed using salt 2 as a key. Log hash 2, the metadata for log entry 206, and summary hash 1, can now be hashed in order to create summary hash 2. Thus, summary hash 2 is now dependent on summary hash 0, summary hash 1, log hash 2 and the metadata, and because of its dependency on other summary hashes it is dependent on other log messages previous to it as well. Thus, by recalculating all the hashes and matching them to the recalculated versions, tampering can be detected.

Similar to log message 206, log message 208 can be entered into the log. For example, log message 208 depicts a log message identical to log message 206, except that it will have a different associated time or ID, a different randomized salt, salt 3, and may have other different metadata such as the network node that generated the event, etc. Because log entry 208 has a different salt even though the same log message is entered into the log, log hash 3 will be different from log hash 2 because of the randomization of the salt. Likewise summary hash 3 will be different then summary hash 2 because of the different log hash 3, the different metadata and/or because it is logging over summary hash 2 instead of summary hash 1.

Log message 210, on the other hand, is a log entry of a different event, event 2, that has occurred. Like the previous log entries before it, the log message that "EVENT 2 OCCURRED" is hashed along with salt 4 to create log hash 4. Log hash 4, the metadata associated with log entry 210, and summary hash 3 are then hashed together to create summary hash 4.

The next log entry, for example, may be a commitment log entry 212 as indicated by the TSP commit log type. As described above, this commit in the log may occur after a configurable number of log entries have occurred or after a time period has occurred. The log message of a commit lot entry may indicate a timestamp digital signature that includes summary hash 4. Alternatively, this information can be represented in a metadata field instead of a log message field. By signing the previous summary hash (the dependency shown with the additional arrow between summary hash 4 and the message of log entry 212), this indicates that that summary hash value for log message 210 existed as of the timestamp, and therefore, all values previous to this commitment entry in the log cannot be tampered with without detection by an entity verifying the log. This protection from tampering would apply to all log entries within the concurrent segment as defined by the log entries existing between the TSP commit log entry 212 and the previous commit log entry, or, in the case of FIG. 2, the start of the hash chain.

It may be advantageous to commit the log entries prior to shutdown of the logging server/program or a computer running a logging program in order to ensure that the log cannot be tampered with. In this case, a verifier would make sure that the log ended with a TSP commit that can be trusted from a time server that it trusts. Log entry 214 indicates a shutdown entry of the log which in some embodiments may be a separate entry as depicted in log entry 214 or may merely be a TSP commit entry as depicted in 212. In the separate shutdown case, this log entry may comprise an empty message, a salt 6 which then may be hashed into log hash 6, metadata, and then the log hash 6 metadata and the summary hash 5 from the previous log entry may be hashed in order to produce summary hash 6.

Figure 3:
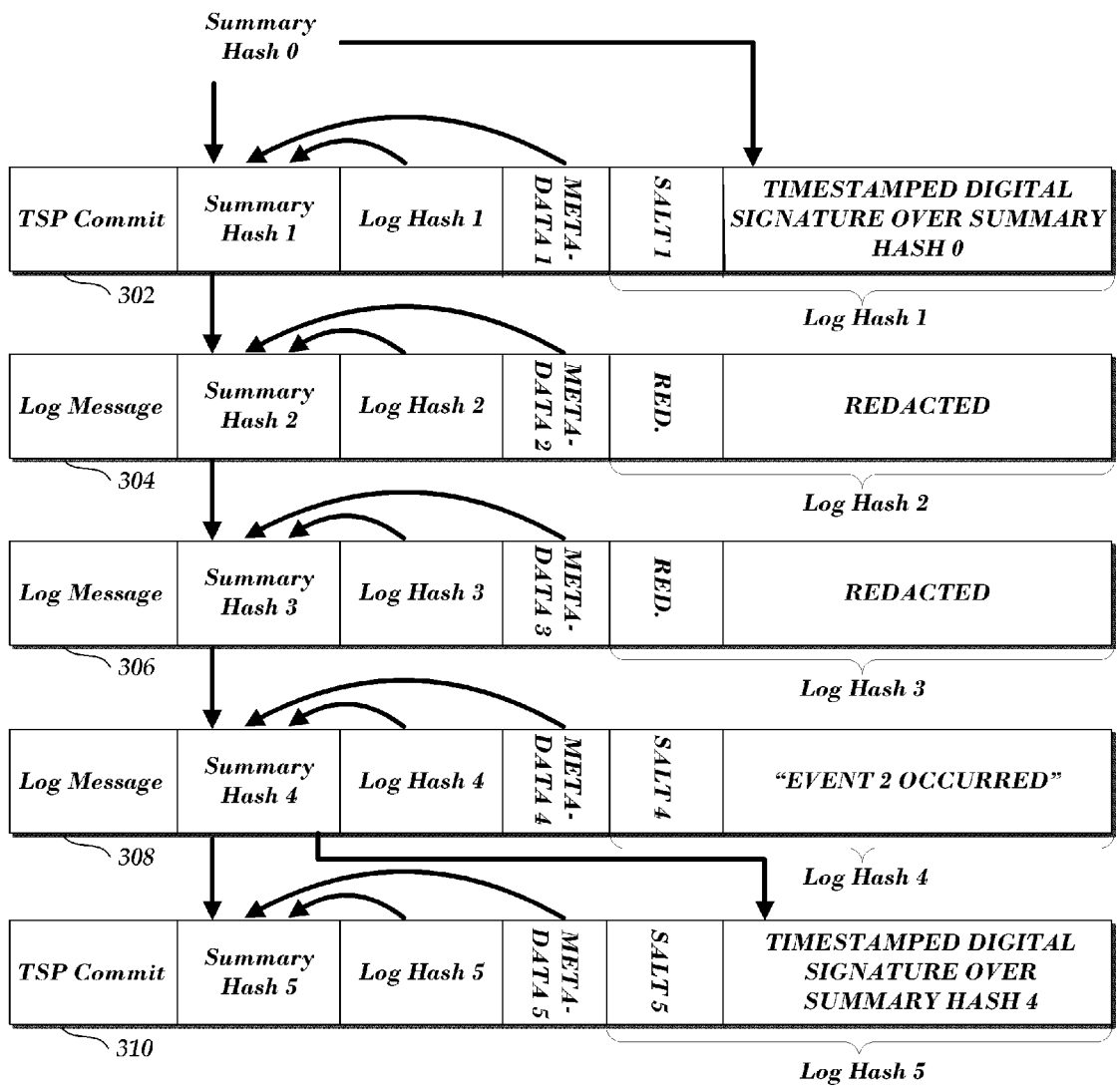
FIG. 3 illustrates a verifiable and redactable logging data structure according to some embodiments of the present disclosure.

FIG. 3 illustrates a sample embodiment of a redacted log segment. In some embodiments, the example segment appearing in FIG. 3 may start with a log entry with a timestamp digital signature, such as the indicated TSP Cert entry in FIG. 2 that presents the digital certificate, or, as depicted in FIG. 3, a commit log entry 302. The digital signature demonstrates the assurance that, based on trust of the time server, the 302 log entry existed as of the timestamp provided by the time server. In some embodiments, a commit log entry 302 may begin the segment. Commit log entry 302 includes a digital signature over a timestamp, but may also include, within the digital signature, the previous log entry's summary hash, whether or not the previous log entry appears in the segment. By including the summary hash, such as summary hash 0 of the previous entry, the digital signature provides a mechanism of trust to guarantee that the summary hash that is being used as input to Summary hash 1, for example, has not been changed, and provides a trusted link back to the previous segment of the log. This heightens the detection for tampering, because summary hash 0 cannot be changed by an attacker who has otherwise tampered with the log.

Log entry 302, like other log entries in this disclosure, may comprise log hash 1, which may be calculated over the log message, such as the timestamped digital signature over summary hash 0, and a salt that provides randomization. This log hash, along with other metadata (which may, in some embodiments, include the digital signature and/or timestamp) and the previous log entry's summary hash, here summary hash 0, may be used as input to the hashing algorithm that results in log entry's summary hash 1. Such a structure provides that summary hash 1 is dependent on the content of the current log entry and previous log entries to enable verification.

The next three log entry messages, in this example, are log entries 304, 306, and 308. The actual log messages may correspond to, for example, the log messages that appear in 206, 208, and 210, respectively. In such a case, the actual log message of log entry 304 may be "EVENT 1 OCCURRED", the message of log entry 306 may be "EVENT 1 OCCURRED", and the message of log entry 308 may be "EVENT 2 OCCURRED".

By way of example, the log segment appearing in FIG. 3 may represent a log segment that has been selected in response to a Freedom of Information Act (FOIA) request. For example, in a request for information concerning even 2, the segment in FIG. 3 can be selected to form a part of the response. In in order to protect privacy of others however, the log has been redacted to remove all other entries unrelated to event 2. For example, log entries 304 and 306 concerning event 1 have been redacted. Redacting the log entry may involve, for example, removing, deleting, or overwriting the log message associated with the log, but may also include, removing selected metadata related to the log entry, if that metadata is not used as a dependency for the summary hashes (or if the metadata, in some embodiments, is included in the log hashes as a dependency instead of the summary hashes). For example, log entries 304 and 306 appear as "REDACTED", but may include any changed text to indicate that the log entry message was removed, or be blank or otherwise not present in the log.

Although log messages corresponding to 304 and 306 are identical, "EVENT 1 OCCURRED", the resulting log hashes, log hash 2 and log hash 3, will, in an overwhelming number of cases, be different than each other because each log hash is dependent on the value of separate random salts. This prevents an attacker from using a dictionary or other attack based on candidate entries for log messages (for example, based on the frequency of other unredacted logs the attacker has obtained) because no two log hashes should be the same, and an attack cannot tell that two log messages contained identical data.

The log may still be verified even with the redacted log messages and redacted salts. For example, even though the salt values and the log messages may be redacted for normal log entries where confidentiality is desired, the verification process can recalculate, match, and verify all summary hash entries by using the log hashes associated with each log entry. Although the log hashes for each redacted entry cannot be verified, the underlying information for the redacted entry is redacted, and is thus not intended to be verified, but merely removed. Thus, no verification of the log hashes for redacted entries need be performed.

In contrast, the log message for log entry 308 was not redacted because that was the target of the FOIA request. For that log entry, verification to detect tampering for the "EVENT 2 OCCURRED" log message can be performed. For example, the salt and "EVENT 2 OCCURRED" log message for 308 can be hashed, by the verifier, such as by using the SALT for the key of an HMAC, and the "EVENT 2 OCCURRED" message as the data for the hash algorithm.

Segments with at least some redacted entries, like a segment with unredacted log entries shown in FIG. 2, may require a commitment log entry at the end of the segment in order to maintain verifiability and security. In some cases, if a commit entry is not included in the log segment, then an attacker could rewrite any portion of the segment after the commitment or certification based on recalculation of all of the appropriate hashes in order to support the modification to the log. By requiring, in some embodiments, a commit entry at the end of the segment, then a time-stamped digital signature that includes a summary hash such as illustrated in log entry 310, can prevent tampering.

For example, the time-stamped digital signature may only be successfully verified if summary hash 4 is included in the input when the digital signature is verified. This means that summary hash 4 had to have been associated with log message 308. And, based on the dependencies, the appropriate hashes for all of the other previous log entries in the log cannot have been changed; otherwise, a recalculation of rehash 4 will appear different in the summary hash 4 than the summary hash 4 value that appears within the time-stamped digital signature. Thus, as indicated in FIG. 3, summary hash 4 can be viewed as an input to the time-stamped digital signature.

Another way to maintain security within a log segment may be to have more than one commit statement. If more than one commit statement appears within the log segment, then the log statements between the commit log entries may be considered secure and verifiable, whereas any log message that appears after the last commit entry may not be verifiable.

Figure 4:
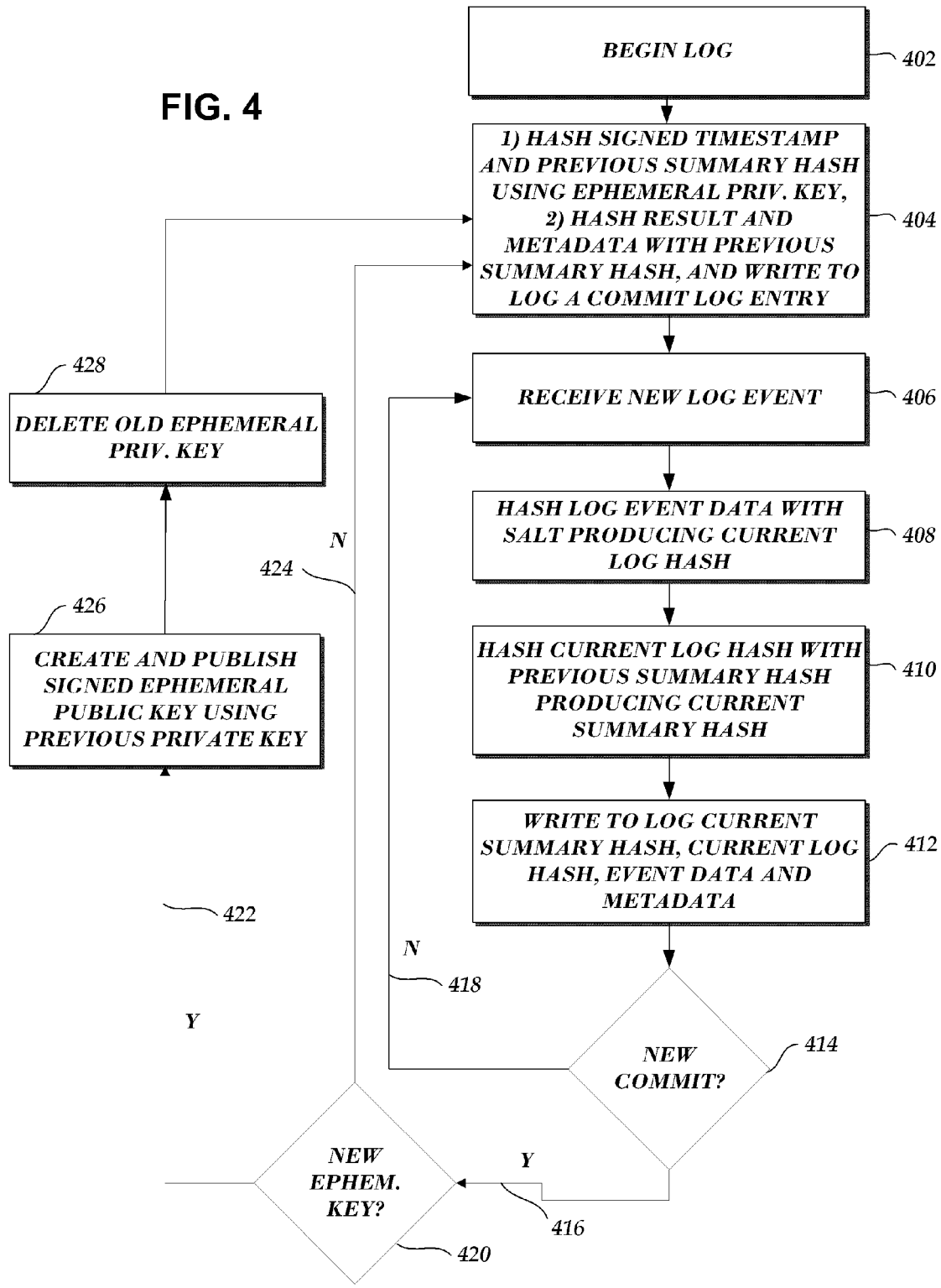
FIG. 4 illustrates a flowchart depicting operations of a logging system using ephemeral keys according to some embodiments of the present disclosure.

FIG. 4 illustrates a method or process that a logging system may implement, similar to FIG. 1, to create verifiable logs. FIG. 4 illustrates an embodiment that incorporates the use of ephemeral keys to provide commitment entries to the log, similar to using a time server or a trusted time server to perform such operations as illustrated in FIG. 1. For example, in block 402, the log can begin by writing an initial log entry, as shown in other figures herein, such as FIG. 1. Alternatively, no beginning log entry need be entered.

In block 404, an ephemeral private key may be used to sign a timestamp and a previous summary hash result. An ephemeral key, as defined above, is a key that is only temporary, temporarily used for a certain time period or for a certain number of log entries, or other configurable duration. The logging system may then hash the digital signature with a salt to create a log hash. After creating the log hash, the entry's summary hash can be created by hashing the metadata, log hash, and the previous summary hash, and write that entry to a commitment log entry.

The advantage of using an ephemeral key to sign the commitment log entries, as opposed to a time server, is that in some embodiments, a time server connected to a network may not be available. This could occur when the log is on its own subsystem, and by way of example, the Internet is unavailable, the logging system is behind a firewall, or the system is a stand-alone device. In these cases, among others, the use of an ephemeral key can provide the same assurance that a time server provides. Namely, a log entry being in existence at a certain time with certain characteristics using a digital signature signed with the ephemeral key.

In this case, in block 404, the logging server may have an ephemeral key that is used to create the digital signature. The ephemeral key is a private key that has a corresponding public key. The ephemeral public key of the public/private key pair can be either known ahead of time or published to the log. For example, block 426 may be executed between beginning the log and block 404. This would create a new ephemeral public/private key pair (for example, using the RSA algorithm set or elliptical curve keys), and publish a signed version of the public ephemeral key using the private key.

Then, in block 404, using the private key, the logging server may sign a hash, such as the summary hash at the beginning log entry, to show/guarantee that the summary hash value existed when the log entry was created. This information can be considered the log message and stored in the location for a normal log message, or in metadata. Then the logging server could hash the resulting digital signature of the time stamp with the salt and create the log hash. The log server may then hash the log hash with the metadata of the log entry and the previous summary hash to create a new summary hash for the current commitment log entry. The logging server may then write the commitment log entry to the log, the log entry comprising the digital signature that includes the previous summary hash and the time stamp as the log message, the summary hash, the metadata, the log hash, and the commitment log type to the log.

Continuing on, in block 406, in some embodiments, the log server may enter a loop to perform multiple log entries based on received events before the next commitment. For example, in block 406, the log server may receive a new log event and proceed according to blocks 406, 408, 410 and 412, performing similar operation to blocks 106, 108, 110 and 112 of FIG. 1.

In block 414, a decision may be made whether to perform a new commitment. This can be based on a configurable time period or the number of log entries or any other configurable duration. If there is not a new commitment, then the logging server may receive another event to log, and continue via block 406. If there is a new commitment, then processing may continue to block 416, where a determination is made whether there is a new ephemeral key required. If not, the processing continues along the processing flow into block 404, where a new commitment log entry may be entered.

If a new ephemeral key is required, then in block 426, the logging server may create and publish a signed ephemeral public key using a previous private key. It may publish this new signed public key, that is created as a public/private key pair, by entering the public key the log entry. For example, see FIG. 5 log entry 504 for on example of such a log entry.

After publishing, the logging server may delete the old ephemeral key and continue processing with a new commitment in step 404. Advantageously, deleting the old ephemeral key prevents an attacker from determining the private ephemeral key to be used to rewrite digital signatures within the log. Therefore, it is very difficult to correctly rewrite any of the digital signatures. However, the log's hash chain can still be verified because the public key has been securely made a part of the log via the periodic signed key publications. And these public keys can be used to verify the digital signatures for the corresponding signatures associated with their secret private keys once held by the logging server.

Furthermore, by signing the new public key using the old private key, the new public keys can be considered to be in a secured chain of custody, so long as each private key in the chain can be trusted and was previously discarded by the logging server.

The blocks in FIG. 4 (and FIG. 1) may not be implemented in the exact order as described. For example, the log could begin in 402 and begin logging events, such as in blocks 406-412, and only commit the log after a configurable time period, and then continuing to perform log commitments as time progresses over sections of the log. Similarly, the creating and publishing assigned ephemeral public key using the previous private key could be performed in combination with a commitment and therefore performing only or producing only one log entry instead of two log entries. This could be done by also integrating the previous summary hash into the digital signature of the public key during key publishing. The above examples are only two of many examples of how the system and process shown in FIG. 4 could be reorganized to produce the same results of a verifiable and redactable log that does not require an external time server or a certificate for committing log entries. In some embodiments, ephemeral keys could be used by an external time server, so long as the first public key used in the chain was trusted, and therefore, the later public keys in the chain may also be trusted.

Figure 5:
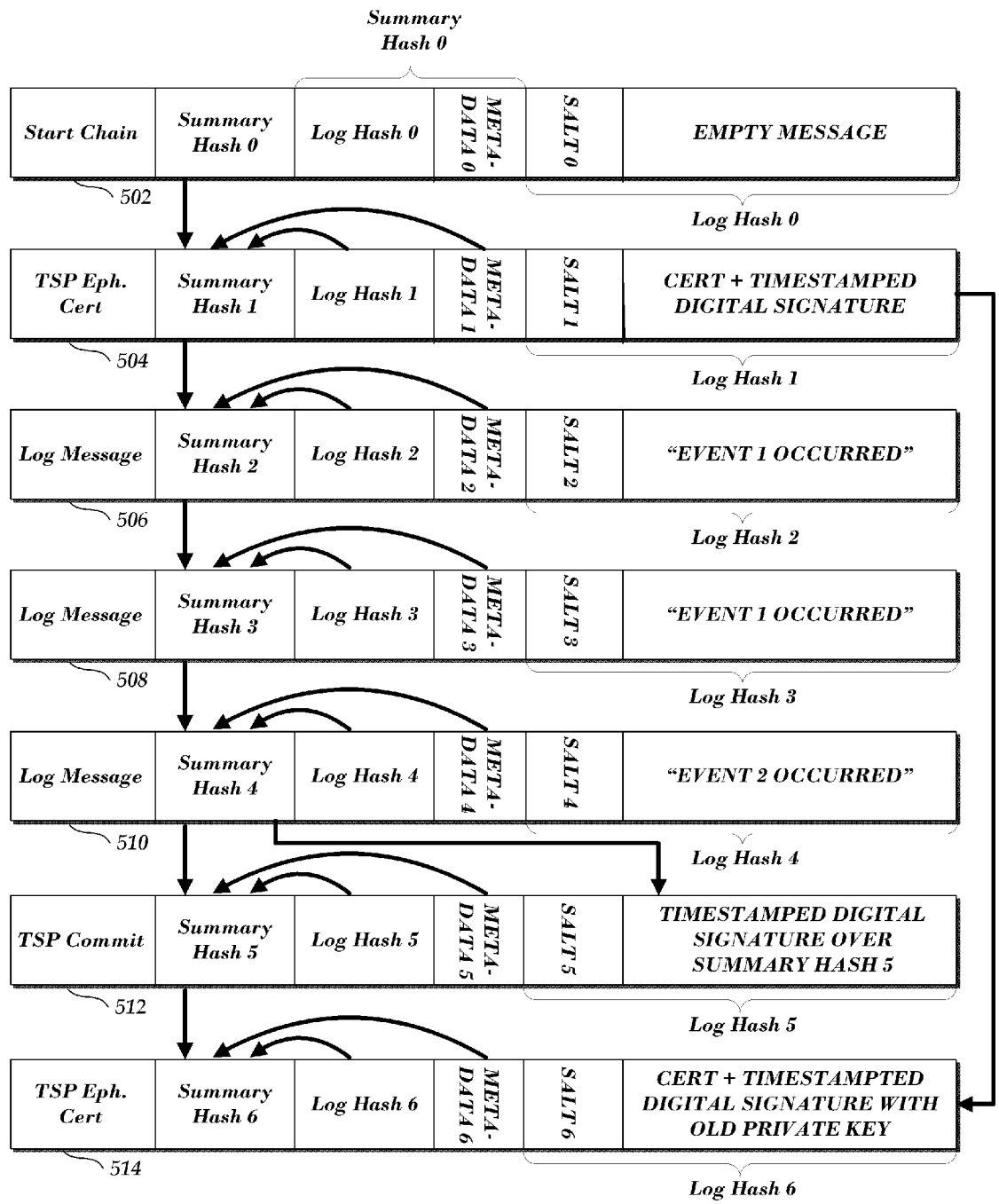
FIG. 5 illustrates a verifiable and redactable logging data structure according to some embodiments of the present disclosure using ephemeral keys.

FIG. 5, similar in many ways to FIG. 2, illustrates a sample log segment that uses ephemeral keys instead of a time server for signing and committing entries to the log, according to one embodiment. The difference is that, unlike in FIG. 2, when an ephemeral key is generated by a logging server, meaning a public and private key pair is generated, then the public portion of the ephemeral key pair must be published within the log so that future log entries that are commitments may be verified. For example, block 504 publishes what is, in essence, a self-signed ephemeral key certificate. This certificate includes the public key that may be used to verify commitment log messages, such as log message 512, going forward in the log. This certificate is signed, unlike normal certificates signed by a certificate authority, using the private key from the previous ephemeral private public key pair so that the chain of private and public keys can continue throughout the log. Therefore, if a system had, at the start of the log, a trusted ephemeral private key, then the remaining public keys throughout the log may also be trusted, as they were generated by the same entity that had the original ephemeral private key and can be cryptographically verified.

As can be seen in block 512, a commit log entry is entered into the log, which commits all of the log entries in the segment previous to the commitment by signing a digital signature that includes the previous summary hash and a timestamp. For example, in this case, summary hash 4 was signed. This guarantees that if the digital signature is trusted, the summary hash 4 data existed as of the time stamp, and therefore could not have been altered. And because summary hash 4 could not be altered, then the verifiability of the above summary hashes for log entries 510 and previous can be verified.

One difference, as described above, is illustrated in block 514 when using ephemeral keys. For example, the arrow from block 504 to 514 indicates that the new public key that is being published in block 514 is being signed with the old private key that is associated with the public key that was published in block 504. As described above, this enables a public/private key pair chain to exist that, when the first private key is trusted, the remaining keys in the chain can be trusted. For example, as the log progresses past log entry 514, eventually there will be another ephemeral certificate log entry similar to log entry 514. This log entry may publish a new private key that is signed with the private key that was generated in association with the public key published in log entry 514, continuing the chain of ephemeral public/private key pairs.

Figure 6:
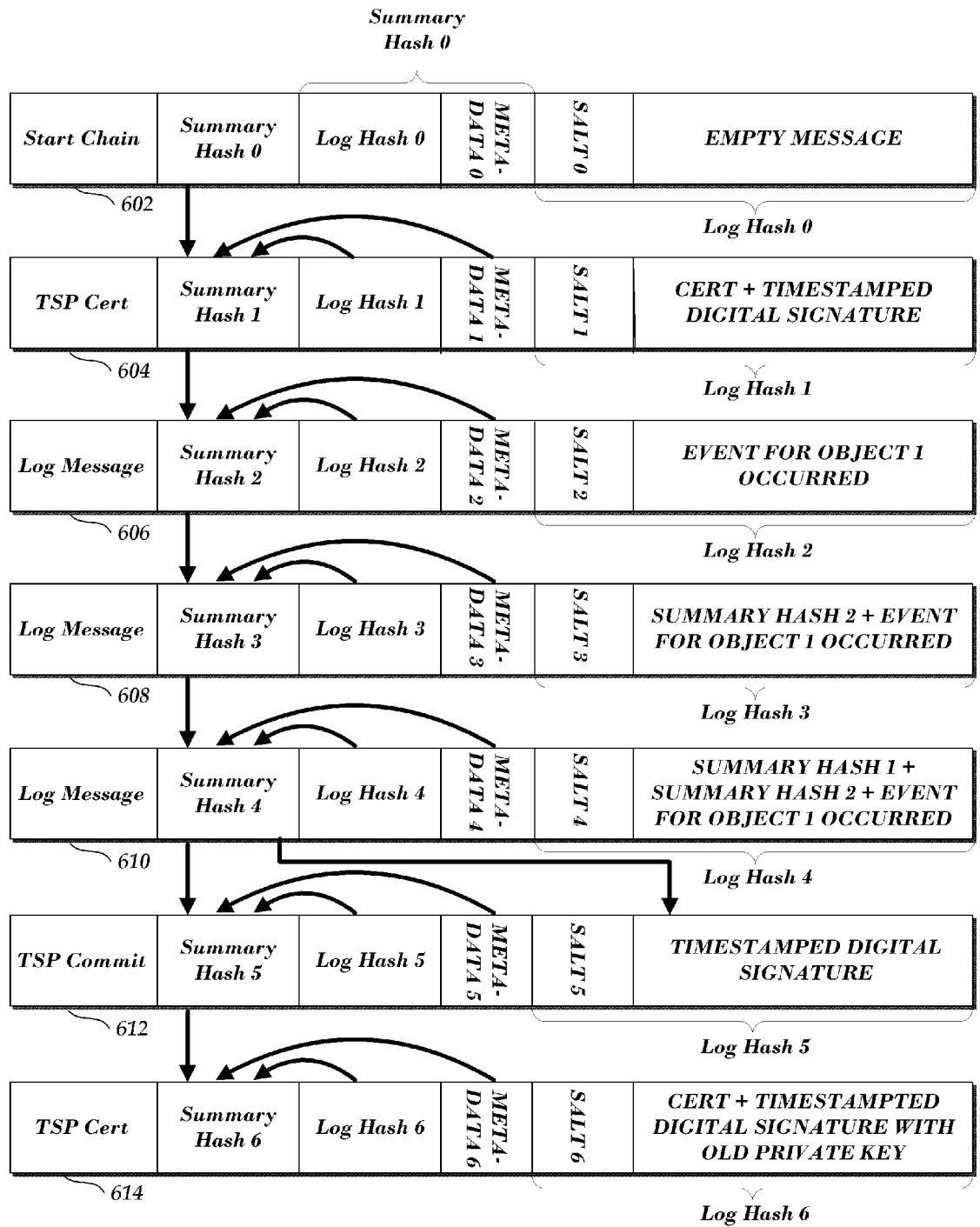
FIG. 6 illustrates a verifiable and redactable logging data structure according to some embodiments of the present disclosure using nested entries.

FIG. 6 illustrates one method of determining that log entries for a specific object or event type have not been omitted from the log. For example, log messages 606, 608, and 610 have to do with multiple events for an object named "object 1." For example, in log message 606, the log entry details that an event for object 1 occurred. In log message 608, for example, another event for object 1 occurred. And in log message 610, another event for object 1 occurred. If these log entries were located in multiple segments, then if responding to a request such as a subpoena or FOIA request, where only a subset of all log data should be reported, then if only certain log segments are sent in response to the subpoena or Freedom of Information Act request, an administrator (or attacker) could selectively omit certain events appearing in the log entry for object 1 by not sending some of the segments reporting events for object 1.

For example, let's say object one is a car that is tracked via license plate recognition. And when the car is seen, sensors send to a logging server information indicating that the license plate was seen. Various log segments contain log entries indicating that the specific license plate was seen. Those log entries in multiple log segments can appear in different sections between commitments. This means that if only certain log segments were returned when a FOIA request is sent in about this specific car with this specific license plate, then even though five events were recorded in the logs, only four could be sent back in response to the request. Such a response that purposely omits one set of log entries may be undetectable.

To prevent this kind of attack of omission, the log entries that are associated with a certain object may be nested. This may be accomplished by inserting all previous log entries associated with that object into the same log entry message. This would mean that a growing trail of log messages are inserted into each log message associated with that object, as time moves on. This could get cumbersome, in that each log entry can quickly grow in size.

In some embodiments, as depicted in FIG. 6, in order to guarantee that certain log entries have not been missed in a response (and to save on storage space), all of the summary hashes of the previous events related to an object can be entered into the log. These summary hashes can be used as keys to previous log events. For example, in block 606, a first event for object 1 occurred. In block 608, a second event for the same object 1 occurred. The second log message includes summary hash 2, which corresponds to the first log message for object 1. Thus, if log message 608 appeared in a segment by itself, then someone viewing log message 608 can look at the log message appearing in 608 and determine that one previous log message associated with object 1 had occurred previously, and that previous log message had summary hash 2. In this example, if the response to the FOIA request did not include a log message having summary hash 2, then it can determine that a log entry for that object was omitted; thus, an omission can be detected.

Moving on, log message 610, for example, could include all the previous summary hashes for the associated object. In other words, it could nest the summary hashes inside the log message 610. Thus, someone looking at or a computer verifying log message 610 for a FOIA response (or any kind of response that is required or a report written by log) can verify that two summary hashes are nested within the log entry also relating to the object one in log message 610. Thus, two previous events should be reported by FOIA. Any other segments that have the same summary hashes—summary hash 1 and summary hash 2. In this way, by using nesting, selective release of information in response to a request may not occur—at least for log entries previous to the last reported log entry for a specific object.

Nesting of log entries, in some embodiments, could comprise keeping a separate log for each object. In this embodiment, multiple logs may be used—a master verifiable, redactable log that records all events/objects, and a second log that only records events for the specific object in a single segment. Using this type of structure prevents any omissions of log entries for the object by recording them all in a single segment that can be turned over in a response.

FIG. 7 describes one embodiment of various devices that may be involved in creating the logs described herein. For example, log server 758, which may include a number of software modules 770, such as a server program or other processes that may be used to create the log, create ephemeral keys, do time server signings, etc., may be implemented on log servers 758 by executing code configured to perform the processes described herein (and create data structures described herein) on one more hardware processors, such code being stored on a non-transitory storage medium.

Log server 758 may be one or more servers, each server having one or more processors that may be able to execute the software instructions, such as machine instructions, compiled code, or an interpreted language, in order to carry out the processes described herein. The log server may receive messages from computing devices such as computing device 752. These log messages may be generated based on a variety of events and objects—for example, computer network activities, financial transactions, and other events (e.g., the license plate tracking example described above).

Once this information is sent to the log server, the log server may store and calculate the hashes necessary to implement the logs described herein and store those log entries in data storage, such as data storage 760. These log entries may then contain information about computer network activities, financial transactions, or any other electronic event. In order to perform the commitments on the log and create commitment log entries, the commit server (e.g. a trusted time server with a public/private key pair) may send log messages to the log server that have digital signatures of timestamps and/or summary hashes. Bilateral communication may exist between the log server and the commitment server. For example, the commitment server may query the log server at various intervals for the most recent summary hash, at which time the commitment server will sign that summary hash, including a timestamp, with its private key, and send that data to the log server to be logged as a commitment entry. The commitment server need not be separate and could be included within log server 758. For example, if the commitment server was a time server program that ran on the log server, then local communication or inter-process communication may be used in order for the two servers to interact and/or to commit log entries. In some other examples, the log server program itself may perform the commitments, for example, by using ephemeral keys, as described herein.

The log server may communicate with other computing devices (such as those sending in events to log and otherwise requiring logging services) and the commitment server using network 756. For example, the computing device(s) 752 may include smartphones, tablets, laptops, and/or other types of computing devices. Network 756 may be may be a packet switched network, such as an IP network, either over a wide area or in a local area, such as a local area network, a wider area enterprise network, or the Internet. The network 756 may be any wired network, wireless network, or combination thereof. In addition, the network 756 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

In some embodiments, the commitment server could contact the data storage for the log itself in order to commit the log entries. In this case, the log server need only to create log entries received from logging entities, such as the computing devices 752, and need not worry about signing commitments of the log that it generates in data storage 760.

In some embodiments, log server 758 may have a user interface, such as a published web-based user interface, that may be used for administration of the logs, configuration of the log server, or to perform requests for or searching of the logs. For example, log server 758 could receive a request from a computing device such as a web browser (or mobile app) running on the computing device 752 based on a queryable search string. The log server may then return all of the log segments to the computing device responsive to the queryable search string after completing its search of data storage 760. The computing device may then receive the log segments and verify that it has received the correct log segments, such as by checking the nested log entries and verifying the log by recalculating all hashes and verifying all digital signatures within the log segments received, and matching them with the values received in the log segments. In this way, the computing device 752 may determine that the log has not been tampered with and it received true and accurate results.

The data source(s) 760 may be embodied in hard disk drives, solid state memories, and/or any other type of non-transitory, computer-readable storage medium remotely or locally accessible to the application server 758. The data source(s) 760 may also be distributed or partitioned across multiple storage devices as is known in the art without departing from the spirit and scope of the present disclosure.

Implementation Mechanisms

According to various embodiments, the auditable, redactable logging system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
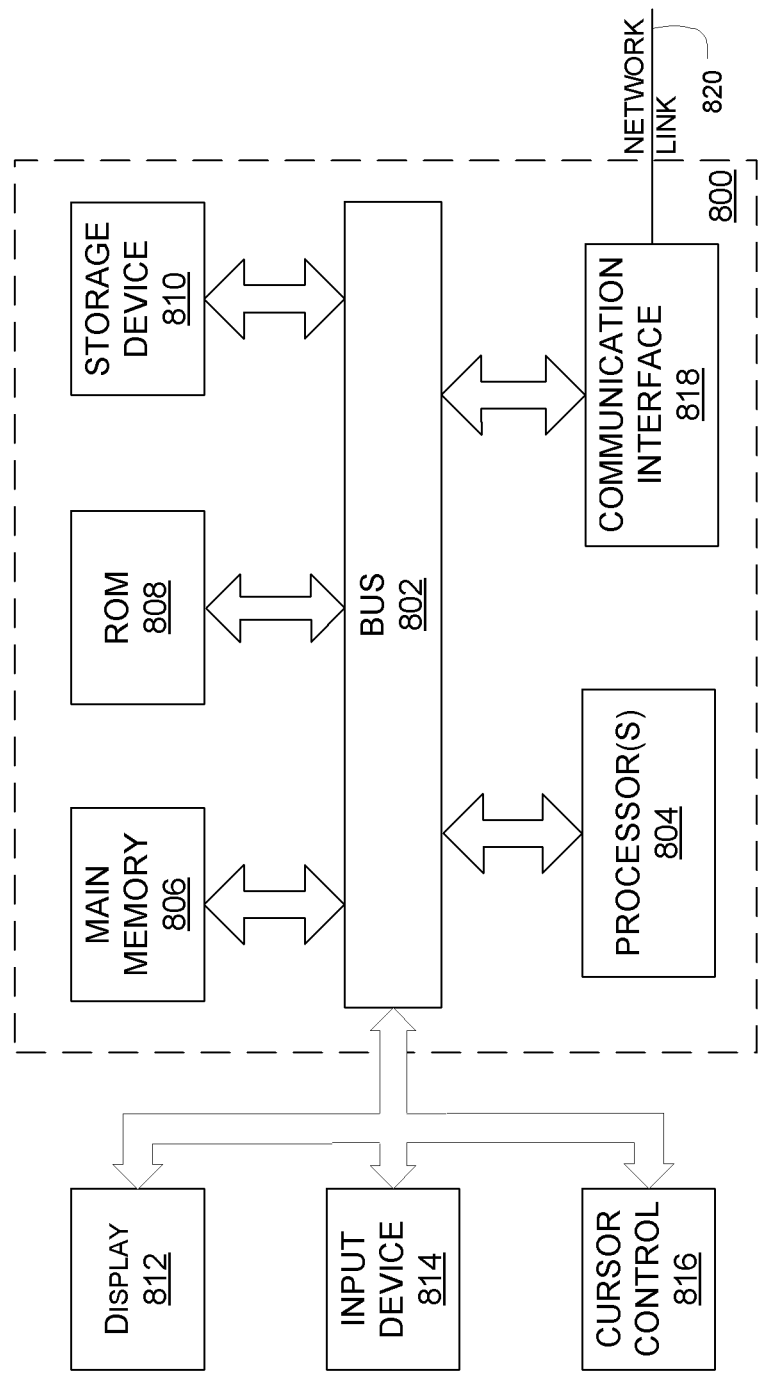
FIG. 8 illustrates computer systems and devices with which various methods and systems discussed herein may be implemented, according to various embodiments of the present disclosure.

For example, FIG. 8 is a block diagram that illustrates a computer system 800 upon which the various systems, devices, and/or methods discussed herein may be implemented. For example, some or all aspects of computing system 800 may be included in any of computing device(s) 852 and/or log server 758. In an embodiment, each of the computing device(s) 752, commit server 774, and log server 758 are comprised of a computing system including some or all of the components discussed herein with reference to the computer system 800 of FIG. 8. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT), LCD display, or touch screen display, for displaying information to a computer user and/or receiving input from the user or operator. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include modules configured to generate a user interface, map interface, and/or the various other aspects of the auditable, redactable logging system. These modules may include, for example, software module(s) 764, 772, or 770 described above, among others. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media", "non-transitory data storage," and similar terms, as used herein refers to any media (singular or plural) that store data and/or instructions, or in combination store data and/or instructions, that cause a machine or machines to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that may be connected to any other interface and/or network, for example network 756 of FIG. 8. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through one or more local or non-local networks to host computers or other data equipment operated by an Internet Service Provider (ISP).

In an embodiment, the network link 820 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 820 and through communication interface 818, which carry the digital data to and from computer system 800, are example forms of transmission media.

Computer system 800 may send messages and/or receive data, including program code, through the network(s), network link 820 and communication interface 818. In the Internet example, a server or other computer-enabled device or system may transmit a requested code for an application program through one or more networks and/or communication interface 818.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method comprising:
accessing first log data;
determining first random or pseudo-random data;
determining first combined data based at least on the first log data and the first random or pseudo-random data;
calculating a first log entry hash based at least on the first combined data;
calculating a first log summary hash associated with the first log data, the first log summary hash based at least on the first log entry hash and a second hash, wherein the second hash is associated with log data that was previously signed with a first ephemeral key;
generating a first log entry, the first log entry comprising the first log entry hash and the first log summary hash;
calculating a second log entry hash based at least on second log data;
calculating a second log summary hash associated with the second log data, the second log summary hash based at least on the second log entry hash;
generating a second log entry based at least on the second log data;
generating a digital signature with a second ephemeral key verifying at least part of the first log entry and the second log entry; and
storing the first log entry and the second log entry.

2. The computer-implemented method of claim 1, wherein the first combined data further comprises a timestamp.

3. The computer-implemented method of claim 1, wherein calculating the first log summary hash based at least on the first log entry hash and the second hash comprises applying a cryptographic hash function to at least part of the first log entry hash and at least part of the second hash.

4. The computer-implemented method of claim 1, further comprising:
accessing the first log entry, the first log entry comprising the first log data;
generating a redacted log entry, wherein generating the redacted log entry comprises removing the first log data from the first log entry, the redacted log entry comprising the first log summary hash; and
transmitting the redacted log entry to a computing device.

5. The computer-implemented method of claim 1, wherein an association between the first ephemeral key and the second ephemeral key is recorded by at least:
generating the second ephemeral key;
signing a public-key portion of the first ephemeral key with the second ephemeral key;
storing the signed public-key portion of the first ephemeral key; and
removing a private-key portion of the first ephemeral key.

6. A non-transitory computer storage medium storing computer executable instructions that when executed by a computer hardware processor perform operations comprising:
accessing first log data;
determining first random or pseudo-random data;
determining first combined data based at least on the first log data and the first random or pseudo-random data;
calculating a first log entry hash based at least on the first combined data;
calculating a first log summary hash associated with the first log data, the first log summary hash based at least on the first log entry hash and a second hash, wherein the second hash is associated with log data that was previously signed with a first ephemeral key;
generating a first log entry, the first log entry comprising the first log entry hash and the first log summary hash;
calculating a second log entry hash based at least on second log data;
calculating a second log summary hash associated with the second log data, the second log summary hash based at least on the second log entry hash;
generating a second log entry based at least on the second log data;
generating a digital signature with a second ephemeral key verifying at least part of the first log entry and the second log entry; and
storing the first log entry and the second log entry.

7. The non-transitory computer storage medium of claim 6, wherein the first combined data further comprises a timestamp.

8. The non-transitory computer storage medium of claim 6, wherein the first log entry comprises a commitment log entry.

9. The non-transitory computer storage medium of claim 7, wherein the timestamp comprises a digital signature from an external timestamping server.

10. The non-transitory computer storage medium of claim 6, wherein calculating a first log summary hash associated with the first log data comprises applying a cryptographic hash function to the first log entry hash and the second hash.

11. The non-transitory computer storage medium of claim 6, wherein the operations further comprise:
accessing the first log entry, the first log entry comprising the first log data;
generating a redacted log entry, wherein generating the redacted log entry comprises removing the first log data from the first log entry, the redacted log entry comprising the first log summary hash; and
transmitting the redacted log entry to a computing device.

12. The non-transitory computer storage medium of claim 6, wherein the operations further comprise:
after a configurable amount of time, generating the second ephemeral key;
signing a public-key portion of the first ephemeral key with the second ephemeral key;
storing the signed public-key portion of the first ephemeral key; and
removing a private-key portion of the first ephemeral key.

13. A computer system comprising:
one or more hardware computer processors programmed, via executable code instructions, to:
access first log data;
determine first random or pseudo-random data;
determine first combined data based at least on the first log data and the first random or pseudo-random data;
calculate a first log entry hash based at least on the first combined data;
calculate a first log summary hash associated with the first log data, the first log summary hash based at least on the first log entry hash and a second hash, wherein the second hash is associated with log data that was previously signed with a first ephemeral key;
generate a first log entry, the first log entry comprise the first log entry hash and the first log summary hash;
calculate a second log entry hash based at least on second log data;
calculate a second log summary hash associated with the second log data, the second log summary hash based at least on the second log entry hash;
generate a second log entry based at least on the second log data;
generate a digital signature with a second ephemeral key verify at least part of the first log entry and the second log entry; and
store the first log entry and the second log entry.

14. The computer system of claim 13, wherein the one or more hardware processors are further programmed, via the executable instructions, to:
after a configurable amount of time, generate the second ephemeral key;
sign a public-key portion of the first ephemeral key with the second ephemeral key;
store the signed public-key portion of the first ephemeral key; and
remove at least a private-key portion of the first ephemeral key from the system.

15. The computer system of claim 14, wherein the first combined data further comprises a timestamp.

16. The computer system of claim 14, wherein the one or more hardware processors are further programmed, via the executable instructions, to:
receive, via a user interface, a search string;
query the first log entry and the second log entry based at least on the search string to identify the second log entry; and
in response to receiving the search string, verify the second log entry by recalculating the second log summary hash from previous log hashes.

17. The computer system of claim 14, wherein the one or more hardware processors are further programmed, via the executable instructions, to:
access the second log entry, the second log entry comprising the second log data;
generate a redacted log entry, wherein generating the redacted log entry comprises removing the second log data from the second log entry, the redacted log entry comprising the second log summary hash; and
transmit the redacted log entry to a computing device.

18. The computer system of claim 14, wherein the one or more hardware processors are further programmed, via the executable instructions, to:
generate a first segment, the first segment comprising the first log entry and the second log entry, wherein the first segment is independently verifiable from other segments; and
store the first segment.

19. The computer system of claim 14, wherein the one or more hardware processors are further programmed, via the executable instructions, to:
determine second random or pseudo-random data; and
determine second combined data based at least on the second log data and the second pseudo-random data, wherein calculating the second log entry hash is further based at least on the second combined data.

20. The computer system of claim 13, wherein the first log entry hash is further based on a timestamp.

21. The computer system of claim 20, wherein the timestamp comprises a digital signature from an external time-stamping server.

* * * * *